US012511949B2

(12) United States Patent
Serout et al.

(10) Patent No.: US 12,511,949 B2
(45) Date of Patent: Dec. 30, 2025

(54) METHOD FOR PROVIDING DATA

(71) Applicant: Robert Bosch GmbH, Stuttgart (DE)

(72) Inventors: Adrien Serout, Aidlingen (DE); Chen Jin, Stuttgart (DE); Rui Qian, Leonberg (DE)

(73) Assignee: Robert Bosch GmbH, Stuttgart (DE)

( * ) Notice: Subject to any disclaimer, the term of this patent is extended or adjusted under 35 U.S.C. 154(b) by 160 days.

(21) Appl. No.: 18/471,598

(22) Filed: Sep. 21, 2023

(65) Prior Publication Data

US 2024/0104971 A1 Mar. 28, 2024

(30) Foreign Application Priority Data

Sep. 23, 2022 (DE) ..................... 10 2022 210 040.9

(51) Int. Cl.
*G07C 5/08* (2006.01)
*G07C 5/00* (2006.01)

(52) U.S. Cl.
CPC ........... *G07C 5/008* (2013.01); *G07C 5/0808* (2013.01)

(58) Field of Classification Search
None
See application file for complete search history.

(56) References Cited

U.S. PATENT DOCUMENTS 6,720,920 B2 * 4/2004 Breed .................. G01S 13/931 342/357.31
7,085,497 B2 * 8/2006 Tiemann .......... H04B 10/25755 398/115
9,773,411 B2 * 9/2017 Popple ................ G06K 7/1417

* cited by examiner

*Primary Examiner* — Abdhesh K Jha
(74) *Attorney, Agent, or Firm* — Michael Best & Friedrich LLP

(57) ABSTRACT

A method for determining data regarding a plurality of functions performed in a vehicle for transmission to a data collection site, in particular for analysis, said method comprising: determining (210), for each of the plurality of functions (201, 202, 203), one or more signals (A, B, C) each at a frequency (222) and having been recorded and/or will be recorded by the respective function; and consolidation of the signals, comprising: checking (230) the signals for multiple existing signals, checking each of the multiple existing signals for different frequencies, and selecting (240), in the case of multiple existing signals at different frequencies, the signal with the highest frequency; and providing (250) information (251) about the consolidated signals in order to determine the data to be transmitted (260).

9 Claims, 2 Drawing Sheets

METHOD FOR PROVIDING DATA

BACKGROUND OF THE INVENTION

The present invention relates to a method for providing data regarding a plurality of functions performed in a vehicle for transmission to a data collection site, in particular for analysis, as well as a computing unit and a computer program for performing said method.

What is referred to as a Selective Catalytic Reduction (SCR) method is used in the aftertreatment of exhaust gases in motor vehicles, in particular for the reduction of nitrogen oxides ($NO_x$). A urea-water solution (HWL) is in this case introduced as a reducing agent solution into the typically oxygen-rich exhaust gas. For this purpose, a dosing module or dosing valve can be used as part of a fluid supply system, which comprises a nozzle to spray or introduce the urea-water solution into the exhaust gas stream. Upstream of an SCR catalyst, the urea-water solution reacts to form ammonia, which subsequently combines with the nitrogen oxides on the SCR catalyst to form water and nitrogen.

Such a fluid supply system, as well as other applications in vehicles, often employs functions that generate various data that can be recorded for analysis and improvement.

SUMMARY OF THE INVENTION

Proposed according to the invention is a method for providing data, as well as a computing unit and a computer program having the features of the independent claims in order to perform said method. Advantageous embodiments are the subject matter of the dependent claims and the description hereinafter.

The invention relates to functions performed in a vehicle, and in particular to their analysis and improvement. In principle, various functions that are required, for example, for the proper operation of the vehicle or a special part of it, come into consideration here. These can, e.g., be monitoring or diagnostic functions, or simply a control or regulation function.

An example of this is a fluid supply system in the vehicle, e.g., what is referred to as an SCR supply system. Such a fluid delivery system typically comprises a conveying unit, e.g., in the form of a pump or comprising a pump, a conveying line through which the conveying unit is connected to a fluid tank, and a pressure line, through which the conveying unit is connected to a dosing module for dispensing fluid. Such a fluid supply system can in particular be employed in an exhaust gas aftertreatment system and therein introduce, e.g., reducing agent or a reducing agent solution into the exhaust gas line. Additionally, a return flow can be connected to the fluid tank via which excess fluid can be recirculated. An aperture or choke in the return can control the return flow.

In the case of exhaust gas aftertreatment systems, the fluid supply system is typically designed to dose the required amount of fluid or reducing agent into the exhaust gas calculated based on the amount of nitrogen oxide emitted at the engine outlet opening. Compliance with this requirement is critical to ensure that no harmful emissions leak out of the vehicle's exhaust. The fluid supply system or fluid therein is pressurized for proper dosing. In order to dose the correct amount, this pressure should be kept as stable as possible.

In such a fluid supply system, various functions can then be used, e.g., simply controlling or regulating operation, or diagnostic or monitoring functions to detect any abnormalities or errors, e.g., during pressurization. Such a function can be based on, for example, artificial intelligence. Likewise, a function can be provided that performs statistical analyses, e.g., a Kolmogorov-Smirnov test, calculate a Kulback-Leibler divergence, or a mean value or variance, or the like. For example, simpler functions can also include only one trigger that responds to increasing or decreasing signal flanks, or absolute or relative values in relation to a threshold value (e.g., in the case of a pressure signal).

While many such functions are often necessary for proper operation of the relevant system, such as the fluid supply system, certain data associated with these functions is necessary to, e.g., validate, improve, or also create new functions. In order to minimize the development time necessary for this purpose, the necessary data can be obtained from vehicles that are actually in operation or in the field. For this purpose, the respective vehicles or a suitable control unit or other executable computing unit, e.g., via a connectivity control unit, can transfer the necessary data to a data collection site, e.g., a central server or what is referred to as a cloud. This can, e.g., be performed via mobile connections.

The more extensive and complicated such functions are, the more data has to be transmitted with them, sometimes even particularly frequently. In particular for functions that function or are improved using machine learning algorithms or artificial intelligence, a great deal of data is needed (e.g., as training data). Too much data can cause transmission issues, not least because of limited bandwidth in wireless data connections, as well as any storage and processing power limits in a connectivity control unit.

Stronger compression of the data is often no longer possible, because data itself is usually compressed as far as possible without suffering data loss. Aggregation prior to transmission can also lead to data loss or loss of information content. It would also be conceivable to limit the number of possible data sets or labels that are transmitted at all—and thus previously recorded. However, this does not seem to be the right way to develop new functions or improve the system in question since, e.g., too few specific details are recorded. It would also be conceivable to reduce the frequency with which such data is transmitted, e.g., only every second instead of transmitting every 100 ms. In this case as well, however, the accuracy nay be too low, especially if a particular function is very time-critical.

Against this background, it is proposed that, for each of a plurality of functions performed in a vehicle, one or multiple signals are determined which have been and/or will be recorded by the respective function (or a computing unit performing the function), e.g., certain output signals or labels that are or can be relevant to the subsequent analysis. This can be done based in particular on a predetermined pattern; such a pattern can be predetermined and implemented, for example, by a developer. For example, a relevant signal can be a pressure value in the fluid supply system for a particular event or a maximum pressure reached. A particular frequency is also determined for each signal. For example, it can be a time period after which the signal is to be determined or recorded again and again. Again, this can in particular be performed based on a predetermined pattern. Such a pattern can, e.g., be predetermined and implemented by a developer. This is particularly true for each function individually.

These signals are then consolidated. For this purpose, the signals are checked for multiple existing signals. This can often be the case with various functions, e.g., in a fluid supply system, when, for example, different functions each record and process a pressure value. However, depending on the function, the frequency with which the signal or pressure value is required for the purpose of an analysis can be different. Therefore, multiple existing signals are each tested for different frequencies, and for multiple existing signals with different frequencies, the signal with the highest frequency (i.e., the shortest time period after which the signal is intended to be recorded again) is removed. Thus, there are only different signals remaining, each at a frequency, specifically the respective highest frequency (or shortest duration). Information about these consolidated signals with the respective frequency, e.g., in the form of a list, is then provided in order to be able to determine the data to be transmitted.

The data to be transmitted can then be selected and/or recorded based on the information about the consolidated signals from the raw data provided. For this purpose, the raw data can, e.g., already be present in the performing computing unit, so that a selection can be made. It is also conceivable that the respective signals with the particular frequency must first be recorded before the data is then transmitted to the data collection site. The data can in this case first be transmitted to a connectivity control unit, which then transmits the data. It is also conceivable that the processing explained is already performed in the connectivity control unit, which then accesses or otherwise obtains the data and/or signals recorded or processed by the respective functions.

In this way, all necessary data can be transmitted for analysis, but the performance of the vehicle or the relevant system is maintained as best as possible.

A computing unit according to the invention, e.g., a control unit of a motor vehicle, an exhaust gas aftertreatment control unit or a pump control unit, or else a connectivity control unit, is configured, in particular in terms of program technology, to perform a method according to the invention.

The implementation of a method according to the invention in the form of a computer program or computer program product with program code for performing all of the method steps is also advantageous since this results in particularly low costs, in particular if a performing control device is also used for further tasks and is therefore present in any event. Finally, also provided is a machine-readable storage medium on which the computer program described hereinabove is stored. Suitable storage media or data carriers for providing the computer program are in particular magnetic, optical and electrical memories, such as hard disks, flash memory, EEPROMs, DVDs, etc. Downloading a program via computer networks (internet, intranet, etc.) is also possible. Such a download can take place in a wire, or cabled, or wireless manner (e.g., via a WLAN, a 3G, 4G, 5G, or 6G connection, etc.).

BRIEF DESCRIPTION OF THE DRAWINGS

Further advantages and embodiments of the invention will become apparent from the description and the accompanying drawings.

The invention is illustrated schematically in the drawings on the basis of exemplary embodiments and is described in detail in the following with reference to the drawings.

DETAILED DESCRIPTION

Figure 1:
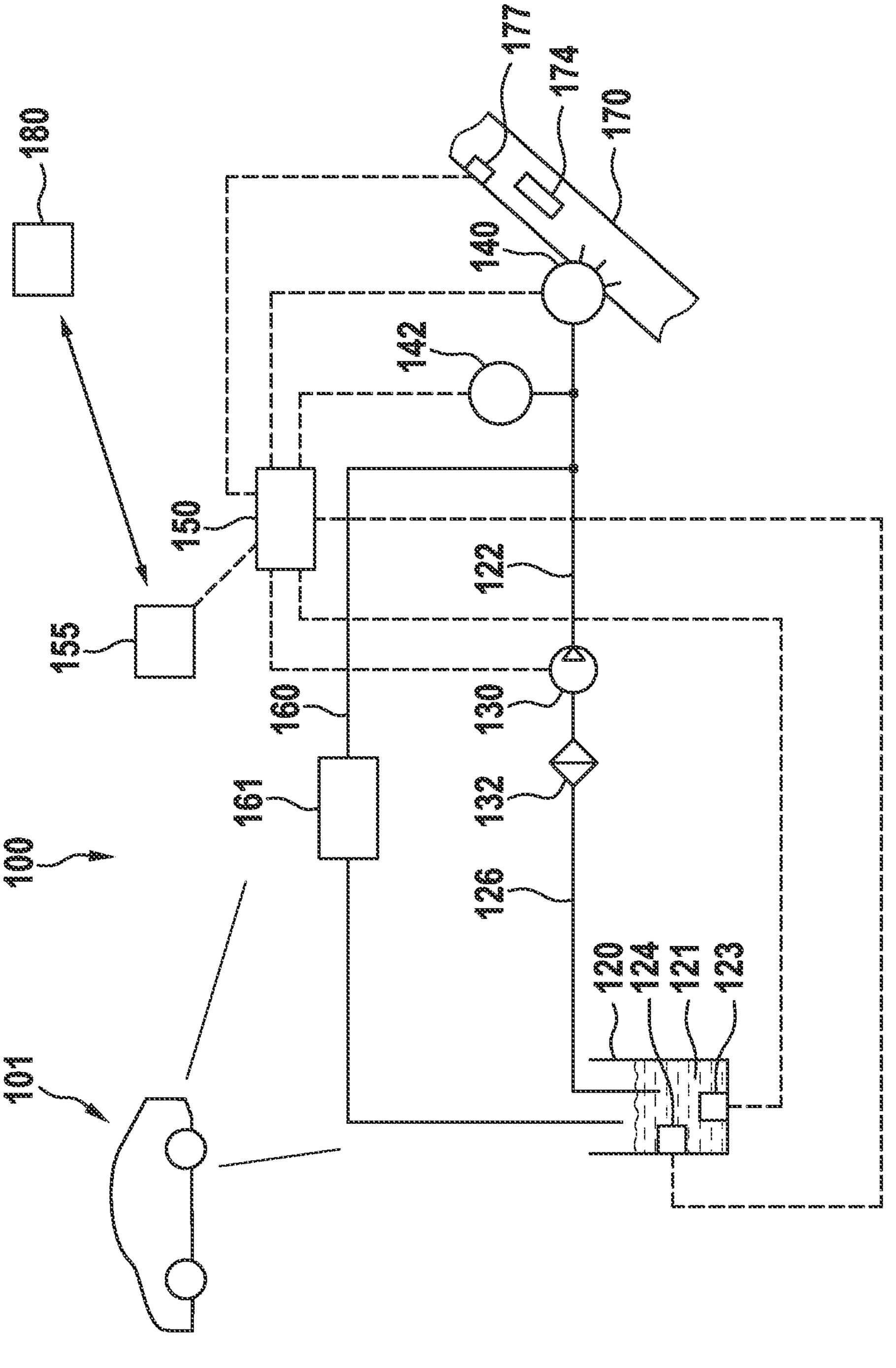
FIG. 1 schematically shows a fluid supply system in a vehicle in which a method according to the invention can be performed.

FIG. 1 schematically shows a fluid supply system 100, in particular in the form of an SCR supply system, of a vehicle 1001 wherein a method according to the invention can be performed. The SCR supply system 100 comprises a delivery unit 130 having a filter 132 designed as a pump. The pump 130 is arranged to deliver fluid or reducing agent 121 (e.g., a urea-water solution) from a fluid tank 120 via a delivery line 126 and a pressure line 122 to a dosing module or dosing valve 140. The fluid 121 is then introduced and/or sprayed into an exhaust gas system 170 or an exhaust line of an engine by means of the dosing valve 140.

Furthermore, a pressure sensor 142 (which can also be integrated into the pump) is provided, which is configured to measure a pressure at least in the pressure line 132—and thus in the fluid. An exemplary temperature sensor 123 and level sensor 124 are also provided in the fluid tank 120. A computing unit 150, for example, in the form of an exhaust gas aftertreatment control unit or an engine control unit, is connected to the pressure sensor 142 and receives information concerning the pressure in the pressure line 122. The computing unit 150 is also connected to the temperature sensor 123 and the level sensor 124. In addition, the computing unit 150 is connected to the pump 130 and the dosing valve 140 to control or operate the SCR supply system 100.

In addition, the SCR supply system 100 comprises, e.g., a return line 160 through which the fluid can be returned to the fluid tank 120. Arranged in this return line 160 is, e.g., an aperture or throttle 161 which provides a local flow resistance. It should be noted, however, that with a pump with actively controlled valves, such a return flow can also be omitted.

The computing unit 150 is configured to use relevant data, such as data received from temperature, pressure, and nitrogen oxide content sensors (e.g., sensor 177) in the exhaust gas, to operate the SCR supply system 100, and in particular to actuate the pump 130 and the dosing valve 140 to supply the urea-water solution 121 (fluid) to the exhaust gas system 170 upstream of an SCR catalyst 174. It should be noted that the pressure can also be determined in a different way than by means of the sensor, e.g., based on operating data of the pump.

For example, various functions such as a pressure control function, a diagnostic function, or a monitoring function can be performed to operate the SCR supply system 100. Relevant signals can be recorded and transmitted, e.g., via a connectivity control unit 155 to a data collection site 180, e.g., a server or what is referred to as a cloud in order to be able to conduct an analysis of the data at a later date.

Figure 2:
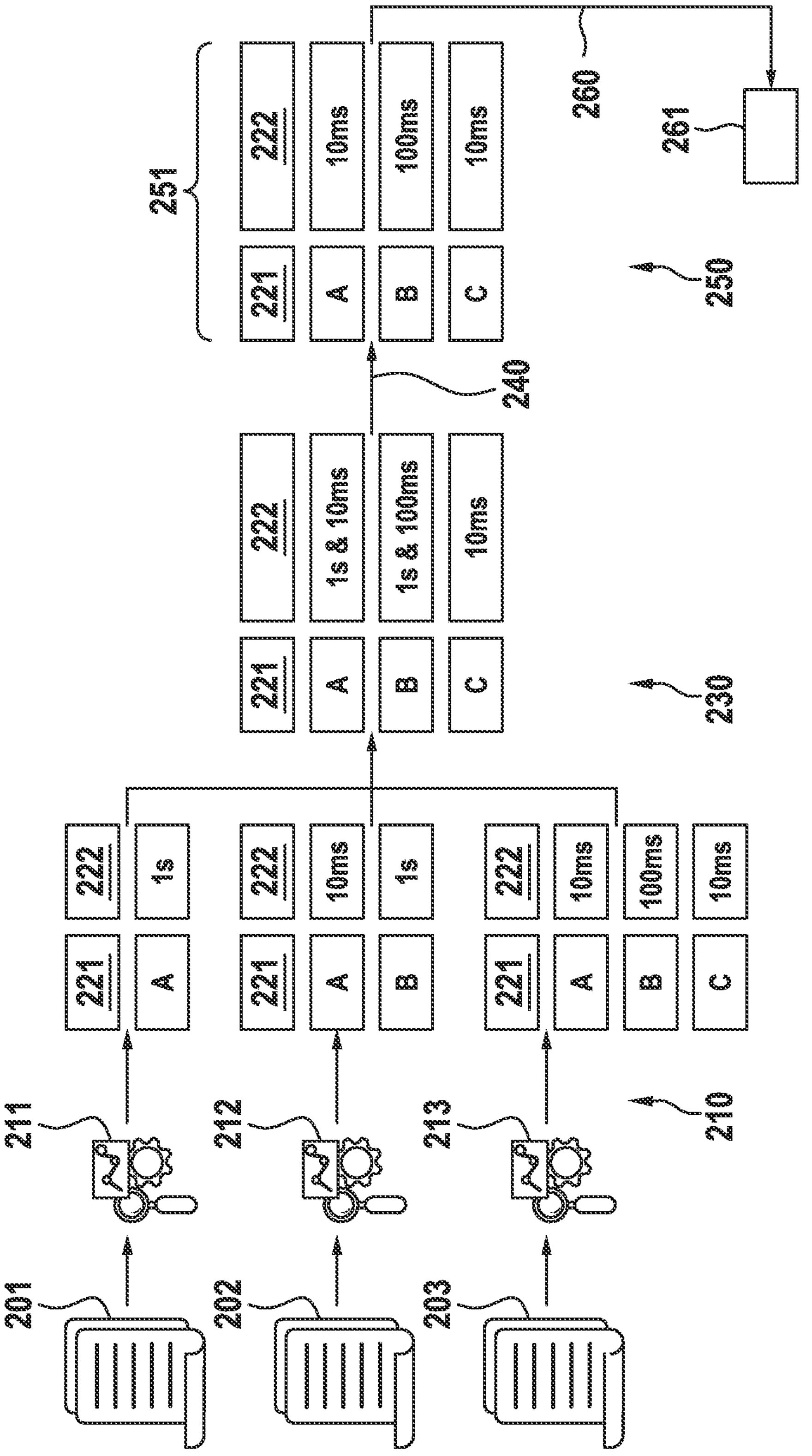
FIG. 2 schematically shows a sequence of a method according to the invention in a preferred embodiment.

FIG. 2 schematically shows a sequence of a method according to the invention in a preferred embodiment. To this end, three exemplary functions 201, 202, 203 are shown as they can be performed in the vehicle. These can be, for example, a simple trigger, a diagnostic function, and a control function. These functions can, e.g., record and/or process various data during operation of the vehicle. However, only certain signals should ever be in these data, each at a frequency of interest. These must be selected and transmitted later.

For this purpose, selection functions 211, 212, 213 are hereinafter shown by way of example, by means of which, step 210, one or more signals are determined, each at a frequency, and which have been recorded and/or will be recorded by the respective function. By way of example, there should be signals A, B and C. In FIG. 2, 221 denotes a signal designation and 222 denotes a frequency (indicated here as a time duration) for the signal in question.

Regarding function 201, signal A is, e.g., intended to be determined at a frequency of 1 s. Regarding function 202, signal A is, e.g., intended to be determined at a frequency of 10 ms, and signal B is intended to be determined at a frequency of 1 s. Regarding function 203, signal A is, e.g., intended to be determined at a frequency of 10 ms, signal B at a frequency of 100 ms, and signal C at a frequency of 10 ms.

These signals are then consolidated. To this end, first step 230 is checked to determine whether there are multiple signals. In this case, these are, e.g., signals A and B. Signal A is present at frequencies of 1 s and 10 ms, and signal B at frequencies of 1 s and 100 ms. Signal C, on the other hand, is only present at a frequency of 10 ms. In step 240, then.

In step 240, the signal with the highest frequency is then selected for the multiple existing signals at different frequencies, in this case signals A and B. In this case, these are signal A at a frequency of 10 ms and signal B at a frequency of 100 ms. Signal C remains at a frequency of 10 ms.

This information 251, e.g., in the form of a list, about the consolidated signals is then provided in step 250. In step 260, based on this information 251, the data 261 to be transmitted can then be determined or recorded before ultimately being transmitted to the data collection site, as mentioned regarding FIG. 1.

The invention claimed is:

1. A computer-implemented method for operating a system in a vehicle, wherein the system includes a selective catalytic reduction (SCR) supply system, the method comprising:

performing, to operate the SCR supply system, at least one function of a plurality of functions of a group consisting of: a control or regulating function, a diagnostic function, a monitoring function, and a trigger;

receiving signals, from sensors, related to the plurality of functions while operating the SCR supply system;

determining, via a computer and for each of the plurality of functions, one or more signals each at a frequency and having been recorded and/or will be recorded by the respective function;

consolidation of the signals by checking, via the computer, the signals for multiple existing signals, checking, via the computer, multiple existing signals for different frequencies, and selecting, via the computer and in the case of multiple signals at different frequencies, the signal with the highest frequency;

providing, via the computer to a connectivity control unit of the vehicle, information about the consolidated signals for determining data to be transmitted via the connectivity control unit; and transmitting, via the connectivity control unit, the data to a data collection site for analysis, wherein results of the analysis are used to modify a subsequent operation of the SCR supply system by controlling at least one of component of the SCR supply system related to the plurality of functions, the at least one component selected from the group consisting of a pump and a dosing valve.

2. The method according to claim 1, wherein the signals for each of the plurality of functions are determined based on a predetermined pattern.

3. The method according to claim 1, wherein the frequency of a respective signal for each of the plurality of functions are determined based on a predetermined pattern.

4. The method according to claim 1, wherein the information about the consolidated signals is determined and provided in each case for a current driving cycle.

5. The method according to claim 1, wherein the data to be transmitted via the connectivity control unit are selected and/or recorded based on the information about the consolidated signals from the raw data provided.

6. The method according to claim 1, wherein the plurality of functions are performed for or in a fluid supply system of the vehicle.

7. The method according to claim 6, wherein the fluid supply system comprises the SCR supply system in which a urea-water solution is used as the fluid.

8. A computing unit including a memory and processor, and the computing unit configured to perform all method steps of a method according to claim 1.

9. A non-transitory, computer-readable medium containing instructions that when executed by a computer cause the computer to operate a system in a vehicle, wherein the system includes a selective catalytic reduction (SCR) supply system, the computer operating the system by:

performing, to operate the SCR supply system, at least one function of a plurality of functions of a group consisting of: a control or regulating function, a diagnostic function, a monitoring function, and a trigger;

receiving signals, from sensors, related to the plurality of functions while operating the SCR supply system;

determining, for each of the plurality of functions, one or more signals each at a frequency and having been recorded and/or will be recorded by the respective function;

consolidating the signals by checking, via the computer, the signals for multiple existing signals, checking, via the computer, multiple existing signals for different frequencies, and selecting, via the computer and in the case of multiple signals at different frequencies, the signal with the highest frequency;

providing, via the computer to a connectivity control unit of the vehicle, information about the consolidated signals for determining the data to be transmitted via the connectivity control unit; and transmitting, via the connectivity control unit, data to a data collection site for analysis, wherein results of the analysis are used to modify a subsequent operation of the SCR supply system by controlling at least one of component of the SCR supply system related to the plurality of functions, the at least one component selected from the group consisting of a pump and a dosing valve.

* * * * *